United States Patent
Uchino et al.

(10) Patent No.: US 9,749,875 B2
(45) Date of Patent: Aug. 29, 2017

(54) MOBILE STATION FOR INTER-BASE STATION CARRIER AGGREGATION

(71) Applicant: NTT DOCOMO, INC., Tokyo (JP)

(72) Inventors: Tooru Uchino, Tokyo (JP); Hideaki Takahashi, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/899,813

(22) PCT Filed: Jun. 20, 2014

(86) PCT No.: PCT/JP2014/066406
§ 371 (c)(1),
(2) Date: Dec. 18, 2015

(87) PCT Pub. No.: WO2014/208462
PCT Pub. Date: Dec. 31, 2014

(65) Prior Publication Data
US 2016/0142924 A1    May 19, 2016

(30) Foreign Application Priority Data

Jun. 25, 2013   (JP) ................................. 2013-132781

(51) Int. Cl.
*H04W 16/32*         (2009.01)
*H04W 36/28*         (2009.01)
(Continued)

(52) U.S. Cl.
CPC ............. *H04W 16/32* (2013.01); *H04L 5/001* (2013.01); *H04L 5/0064* (2013.01); *H04W 36/28* (2013.01); *H04W 92/20* (2013.01)

(58) Field of Classification Search
CPC ... H04W 16/32; H04W 92/20; H04W 76/025; H04W 36/28; H04L 5/0064; H04L 5/001; H04L 5/00
See application file for complete search history.

(56) References Cited

U.S. PATENT DOCUMENTS

| 2009/0239554 | A1 | 9/2009 | Sammour et al. |
| 2010/0330995 | A1 | 12/2010 | Aoyama et al. |
| 2016/0014628 | A1* | 1/2016 | Kim ...................... H04W 24/10 370/329 |

FOREIGN PATENT DOCUMENTS

| JP | 2011-519497 A | 7/2011 |
| WO | 2009/096195 A1 | 8/2009 |
| WO | 2013023353 A1 | 2/2013 |

OTHER PUBLICATIONS

International Search Report issued in corresponding application No. PCT/JP2014/066406 dated Aug. 19, 2014 (2 pages).
(Continued)

*Primary Examiner* — Nam Huynh
(74) *Attorney, Agent, or Firm* — Osha Liang LLP

(57) ABSTRACT

A situation where the important configuration setting is delayed is avoided during execution of "Inter-eNB CA". A mobile station UE according to the present invention includes: a priority management unit 13 configured to manage a priority of each radio base station, each cell or each RRC message; and an RRC message processing unit 12 configured to, when RRC messages are received from a radio base station eNB#1 and a radio base station eNB#2, process the RRC messages based on the priorities.

10 Claims, 5 Drawing Sheets

(51) Int. Cl.
H04L 5/00 (2006.01)
H04W 92/20 (2009.01)

(56) References Cited

OTHER PUBLICATIONS

Written Opinion issued in corresponding application No. PCT/JP2014/066406 dated Aug. 19, 2014 (3 pages).
Nokia Siemens Networks, et al.; "Periodic CSI feedback modes for DL CoMP"; 3GPP TSG-RAN WG1 Meeting #70, R1-123641, Qingdao, China; Aug. 13-18, 2012 (3 pages).
MediaTek Inc.; "Discussion on non-satisfied relevant scenarios and requirements of FDD-TDD joint operation"; 3GPP TSG RAN WG1 Meeting #74bis, R1-134438, Guangzhou, China; Oct. 7-11, 2013 (3 pages).
Ericsson (Rapporteur); "Summary of email discussion [81bis#18][LTE/SCE-HL] CP protocol and architecture alternatives"; 3GPP TSG-RAN WG2 #82, R2-131673, Fukuoka, Japan; May 20-24, 2013 (35 pages).
Extended European Search Report issued in the counterpart European Patent Application No. 14817051.7, dated Jan. 24, 2017 (11 pages).
Intel Corporation; "Mobility mechanisms minimizing UE context transfer & signalling to CN"; 3GPP TSG RAN WG2 #81bis, R2-131407; Chicago, USA, Apr. 15-19, 2013 (6 pages).
Nokia Siemens Networks, et al.; "Mobility Statistics for Macro and Small Cell Dual-Connectivity Cases"; 3GPP TSG-RAN WG2 Meeting #81bis, R2-131056; Chicago, USA, Apr. 15-19, 2013 (7 pages).

\* cited by examiner

MOBILE STATION FOR INTER-BASE STATION CARRIER AGGREGATION

TECHNICAL FIELD

The present invention relates to a mobile station.

BACKGROUND ART

In Release-10 of LTE (Long Term Evolution), CA (Carrier Aggregation) was introduced as control for achieving broadband communications beyond 20 MHz while maintaining "backward compatible".

The CA is capable of achieving high throughput by performing communications with multiple (a plurality of) CCs (Component Carriers) aggregated.

The CA ("Intra-eNB CA") in LTE Release-10, however, has a constraint in which CCs that can be aggregated should be under the same radio base station eNB as illustrated in FIG. 4.

For this reason, when a telecommunication carrier desires to implement the CA, the telecommunication carrier is always required to make network deployment such that CCs can be located under the same radio base station eNB. This poses a problem of making flexible network deployment difficult.

In order to solve this problem, as one of techniques for "SCE (Small Cell Enhancement)" in LTE Release-12 and beyond, "Inter-eNB CA" has been studied with the view of introduction. The "Inter-eNB CA" is CA performed with CCs under different radio base stations eNBs aggregated as illustrated in FIG. 5.

As illustrated in a part (a) in FIG. 6, the existing "Intra-eNB CA" is configured such that a single radio base station eNB always transmits an RRC (Radio Resource Control) message.

In contrast to this, "Inter-eNB CA", has been studied such that radio base stations eNBs can transmit their respective RRC messages as illustrated in a part (b) of FIG. 6 (For example, see Non-patent document 1).

For example, each radio base station eNB is expected to directly send a mobile station UE an RRC message for setting or changing the configuration specific to the radio base station eNB (the configuration is, for example, PUCCH (Physical Uplink Control Channel) resource, SRS (Sounding Reference Symbol) resource, or the like). Accordingly, it is expected that there is a possibility that the mobile station UE will simultaneously receive different RRC messages from different radio base stations eNBs.

PRIOR ART DOCUMENT

Non-Patent Document

Non-patent document 1: 3GPP Contribution Document R2-131673

SUMMARY OF THE INVENTION

In this connection, depending on what are implemented in a mobile station UE (for example, physical capacities of the mobile station UE, such as a CPU processing capacity and a memory capacity), the mobile station UE has a possibility of failing in processing multiple different RRC messages in parallel when the mobile station UE simultaneously receives the different RRC messages from different radio base stations eNBs.

In this case, which one of the multiple RRC messages received simultaneously is to be processed preferentially by the mobile station UE is an implementation matter of the mobile station UE.

For this reason, in such a mobile station UE, important configuration setting related to the connectivity of the mobile station UE may be delayed because the mobile station UE cannot preferentially process an RRC message with a high priority. This poses a problem in that a situation unfavorable from the viewpoint of the connectivity may occur.

Therefore, the present invention was made in view of the foregoing problems, and has an objective to provide a mobile station capable of avoiding a situation where important configuration setting is delayed during execution of "Inter-eNB CA".

Means for Solving the Problem

In summary, a first feature of the present invention is a mobile station configured to be able to perform carrier aggregation using a cell under a first radio base station and a cell under a second radio base station, the mobile station including: a priority management unit configured to manage a priority of each radio base station, each cell, or each RRC message; and a processing unit configured to, when RRC messages are received from the first radio base station and the second radio base station, process the RRC messages based on the priorities.

MODE FOR CARRYING OUT THE INVENTION (Mobile Communication System According to First Embodiment of the Invention)

Figure 1:
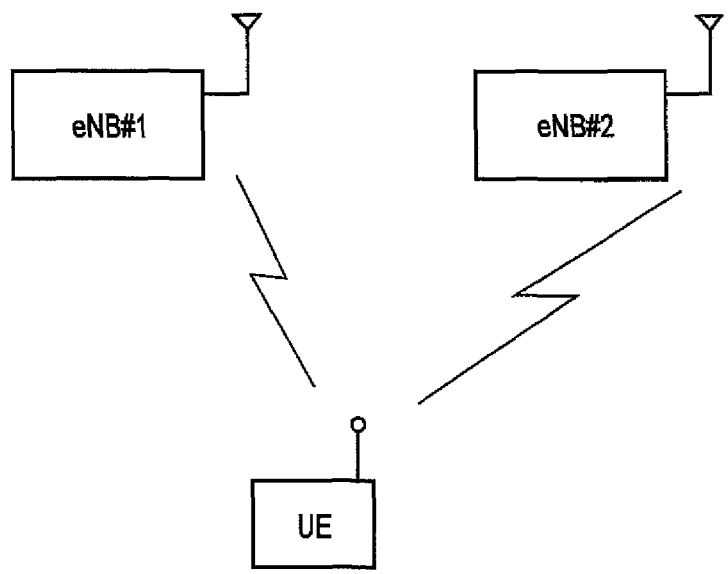
FIG. 1 is an overall configuration diagram of a mobile communication system according to a first embodiment of the present invention.
Figure 2:
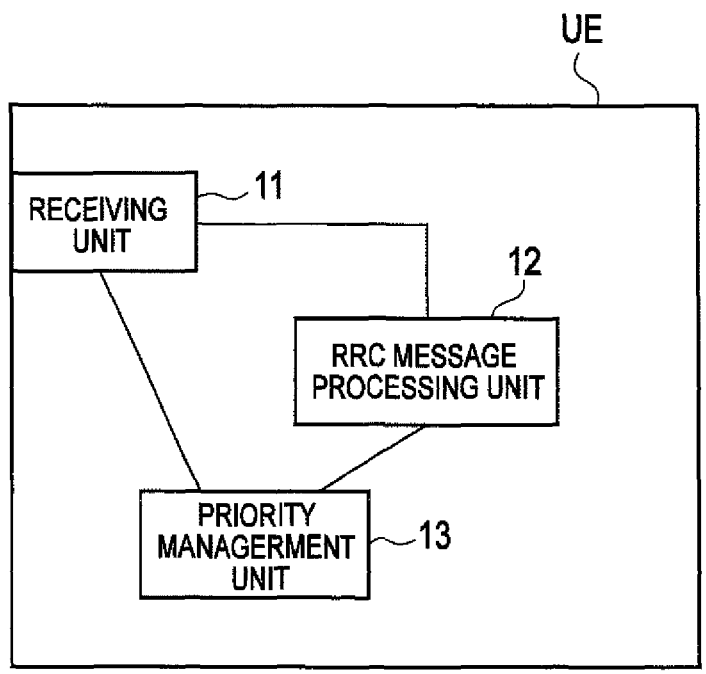
FIG. 2 is a functional block diagram of a mobile station according to the first embodiment of the present invention.
Figure 3:
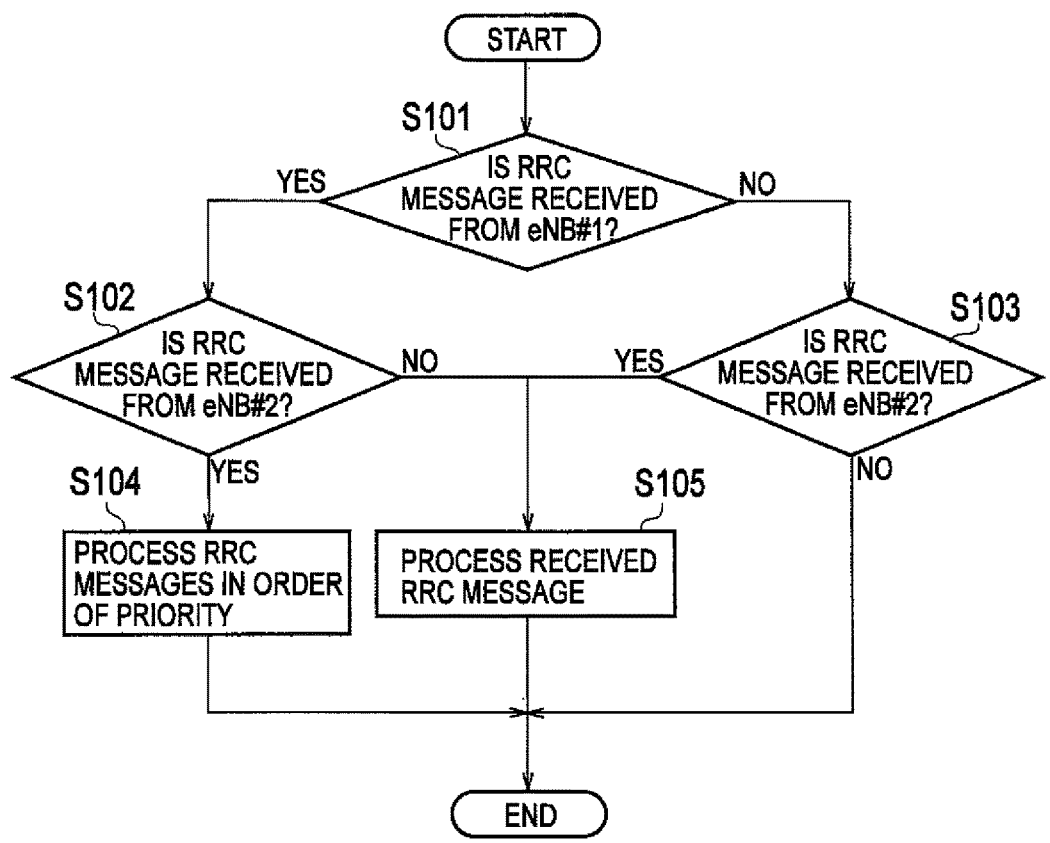
FIG. 3 is a flowchart illustrating an operation of the mobile station according to the first embodiment of the present invention.
Figure 4:
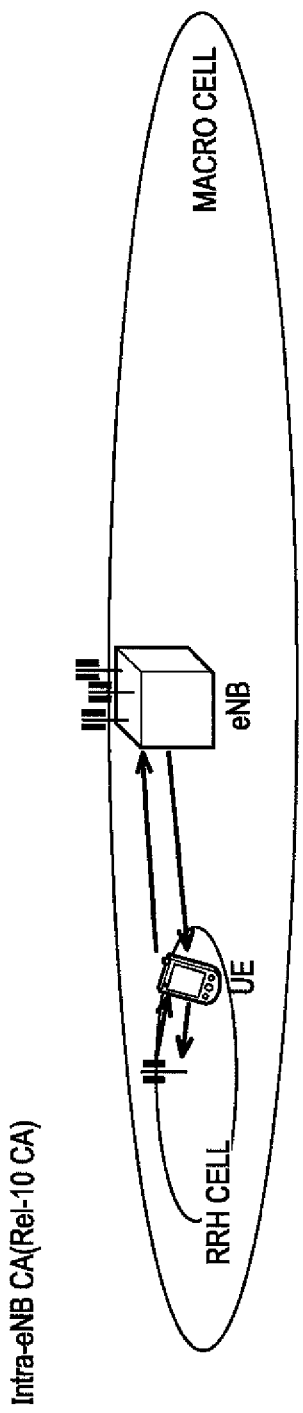
FIG. 4 is a diagram for explaining Intra-eNB CA.
Figure 5:
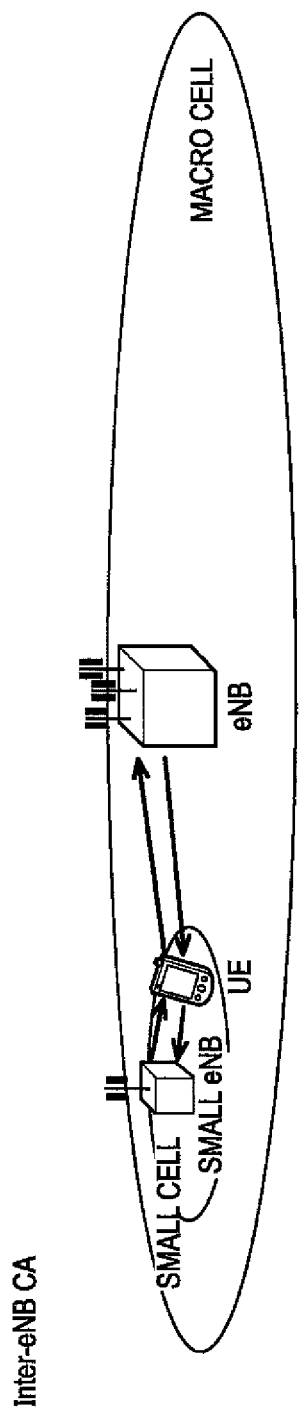
FIG. 5 is a diagram for explaining Inter-eNB CA.
Figure 6:
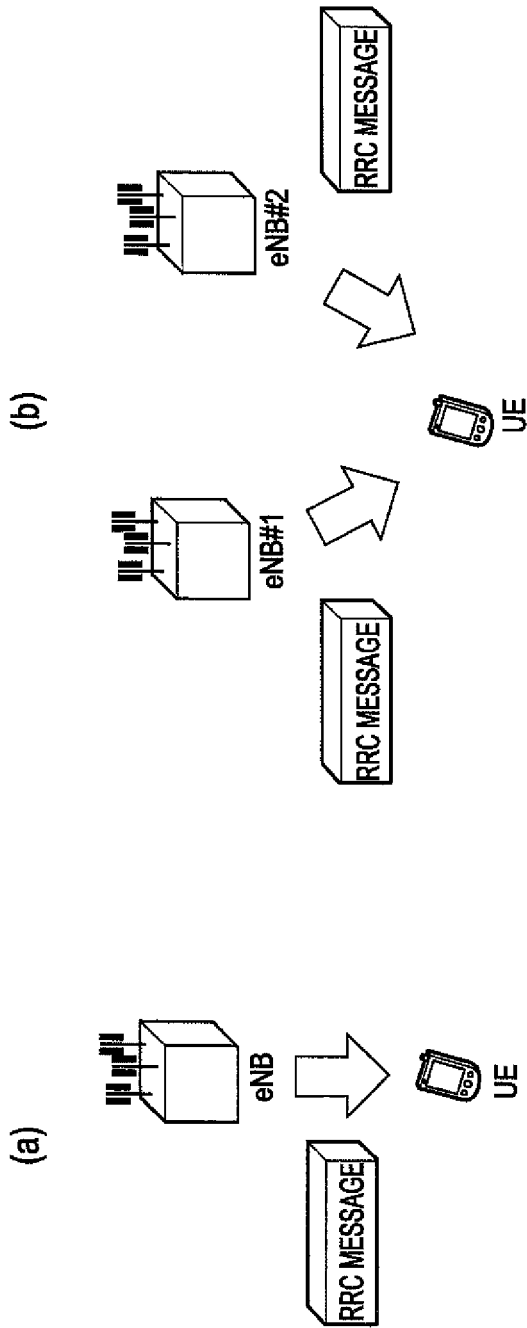
FIG. 6 is a diagram for explaining transmission of an RRC message in Intra-eNB CA and transmission of RRC messages in Inter-eNB CA.

With reference to FIGS. 1 to 3, description is provided for a mobile communication system according to a first embodiment of the present invention.

The mobile communication system according to the present embodiment is an LTE-Advanced mobile communication system, and includes a radio base station eNB#1 and a radio base station eNB#2 as illustrated in FIG. 1.

In the mobile communication system according to the present embodiment, the mobile station UE is configured to be able to perform "Inter-eNB CA" by using a cell under the radio base station eNB#1 and a cell under the radio base station eNB#2.

As illustrated in FIG. 2, the mobile station UE according to the present embodiment includes a receiving unit 11, an RRC message processing unit 12, and a priority management unit 13.

The receiving unit 11 is configured to receive various kinds of information from the radio base station eNB#1 and the radio base station eNB#2.

For example, the receiving unit 11 is configured to receive RRC messages from both the radio base station eNB#1 and the radio base station eNB#2 in the case where "Inter-eNB CA" mentioned above is performed.

The RRC message processing unit 12 is configured to process RRC messages based on predetermined priorities.

Here, the aforementioned priory may be a radio base station eNB priority set for each radio base station eNB, a cell priority set for each cell, or an RRC message priority set for each RRC message.

In addition, the aforementioned priory may have two levels of "High" and "Low" or n levels of "1" to "N".

For example, the RRC message processing unit 12 is configured to, out of two RRC messages received from both the radio base station eNB#1 and the radio base station eNB#2, process the RRC message with the higher radio base station eNB priority, and then process the RRC message with the lower radio base station eNB priority.

The priority management unit 13 is configured to manage the aforementioned priorities. For example, the priority management unit 13 may be configured to manage, as the aforementioned priorities, priorities determined in advance, or priorities notified of by a network.

In addition, the priority management unit 13 may be configured to give a higher priority to a radio base station eNB to which the mobile station UE is connected first after transitioning from an RRC_Idle state to an RRC_Connected state, than the priority of another radio base station eNB.

Alternatively, the priority management unit 13 may be configured to give a higher priority to an Anchor-eNB than the priority of another radio base station eNB.

For example, the Anchor-eNB may be a radio base station eNB which establishes "S1-C I/F" with a mobility management node MME, or a radio base station eNB under which a Pcell for the mobile station UE is established.

Moreover, the foregoing priority may be notified of through broadcast information transmitted by each radio base station eNB.

Here, the priority management unit 13 may be configured to give a higher priority to a radio base station eNB set as a default radio base station eNB than the priority of another radio base station eNB, in the case where the aforementioned broadcast information does not notifies the foregoing priorities.

In addition, the RRC message processing unit 12 may be configured not to process RRC messages (priority control) based on the foregoing priorities, if certain information (for example, "Any") is set as the foregoing priorities in the broadcast information.

Instead, the foregoing priority may be notified of through dedicated signaling transmitted by each radio base station eNB.

For example, the foregoing priority (for example, a secondary cell priority) may be notified of via a "Scell addition message" which is transmitted in the course of setting CA.

Alternatively, the foregoing priority (for example, an RRC message priority) may be notified of via each RRC message.

Hereinafter, with reference to FIG. 3, description is provided for an operation of the mobile communication system according to the present embodiment, or more specifically an operation of the mobile station UE according to the present embodiment.

As illustrated in FIG. 3, the mobile station UE receives an RRC message from the radio base station eNB#1 in step S101, and together receives an RRC message from the radio base station eNB#2 in step S102. In this case, the mobile station UE processes the RRC messages based on the foregoing priorities in step S104.

To be precise, if the priority of the radio base station eNB#1 is higher than the priority of the radio base station eNB#2, if the priority of the cell under the radio base station eNB#1 is higher than the priority of the cell under the radio base station eNB#2, or if the priority of the RRC message received from the radio base station eNB#1 is higher than the priority of the RRC message received from the radio base station eNB#2, the mobile station UE first processes the RRC message received from the radio base station eNB#1, and thereafter processes the RRC message received from the radio base station eNB#2.

Inversely, if the priority of the radio base station eNB#2 is higher than the priority of the radio base station eNB#1, if the priority of the cell under the radio base station eNB#2 is higher than the priority of the cell under the radio base station eNB#1, or if the priority of the RRC message received from the radio base station eNB#2 is higher than the priority of the RRC message received from the radio base station eNB#1, the mobile station UE first processes the RRC message received from the radio base station eNB#2, and thereafter processes the RRC message received from the radio base station eNB#1.

In another case, if the mobile station UE receives the RRC message from the radio base station eNB#2 in step S103 without receiving any RRC message from the radio base station eNB#1 in step S101, the mobile station UE processes the RRC message received from the radio base station eNB#2 in step S105.

In another case, if the mobile station UE receives the RRC message from the radio base station eNB#1 in step S101, but does not receive any RRC message from the radio base station eNB#2 in step S102, the mobile station UE processes the RRC message received from the radio base station eNB#1 in step S105.

In still another case, if the mobile station UE neither receives a RRC message from the radio base station eNB#1 in step S101, nor receives a RRC message from the radio base station eNB#2 in step S103, this operation is terminated.

The features of the present embodiment may be expressed as follows.

In summary, a first feature of the present embodiment is a mobile station UE configured to be able to perform "Inter-eNB CA (carrier aggregation)" by using a cell under a radio base station eNB#1 (first radio base station) and a cell under a radio base station eNB#2 (second radio base station), the mobile station UE including: a priority management unit 13 configured to manage a priority of each radio base station eNB, each cell, or each RRC message; and an RRC message processing unit 12 configured to process RRC messages received from the radio base station eNB#1 and the radio base station eNB#2 based on the priorities, when the RRC messages are received from the radio base station eNB#1 and the radio base station eNB#2.

According to the first feature of the present embodiment, different RRC messages received from the different radio base stations eNB#1 and eNB#2 are processed on the basis of the certain priorities, which makes it possible to avoid a situation where important configuration setting is delayed during execution of "Inter-eNB CA". In other words, with this feature, when receiving different RRC messages from different radio base stations eNBs simultaneously (at the same timing), a mobile station UE, which is even incapable of processing multiple RRC messages in parallel, can preferentially process the RRC message with the higher priority out of the RRC messages received simultaneously.

In the first feature of the present embodiment, the priority management unit 13 may be configured to give a higher priority to a radio base station eNB, to which the mobile station UE is first connected after transitioning from an RRC_Idle state (idle state) to an RRC_Connected state (connected state), than the priority of another radio base station eNB.

According to this feature, the priority of the foregoing radio base station eNB considered to play an important role with the objective of ensuring of connectivity is set to be higher than the priority of the other radio base station eNB. This makes it possible to avoid a situation where important configuration setting is delayed during execution of "Inter-eNB CA".

Here, possible important configurations are, specifically, setting for measurement by the mobile station UE, layer 2 reset, security update, and the like.

For example, the mobile station UE needs to monitor a quality in a downlink, and always connect to the optimal cell. Hence, the setting for such quality monitoring concerns the connectivity between the mobile station UE and the radio base station eNB, and therefore needs to be always given a high priority.

In addition, in the case where there is inconsistency between layer 2 states of the mobile station UE and the radio base station eNB, the radio base station eNB sends an RRC message for resetting the layer 2 state of the mobile station UE and making the layer 2 states consistent with each other (otherwise, data transmission and reception are disabled). Hence, the setting for such layer 2 reset concerns data transmission by a bearer, and therefore needs to be given a high priority.

Moreover, during communications with the mobile station UE, the radio base station eNB performs processing of updating a security key in a case where a connection time exceeds a predetermined period, or where an instruction is received from a core network. Hence, the setting for such security update needs to be given a high priority for the purpose of ensuring confidentiality and integrity of user data or signaling signals.

In the first feature of the present embodiment, the priority management unit 13 may be configured to give a higher priority to Anchor-eNB (anchor radio base station) than the priority of another radio base station eNB.

According to this feature, the priority of the Anchor-eNB considered to play an important role with the objective of ensuring of connectivity is set to be higher than the priority of the other radio base station eNB. This makes it possible to avoid a situation where important configuration setting is delayed during execution of "Inter-eNB CA".

In the first feature of the present embodiment, the Anchor-eNB may be a radio base station eNB which establishes "S1-C I/F (connection for control signal)" with a mobility management node MME.

In the first feature of the present embodiment, the Anchor-eNB may be a radio base station eNB under which Pcell (primary cell) for the mobile station UE is established.

According to these features, a radio base station eNB considered to play an important role with the objective of ensuring of connectivity can be set as Anchor-eNB.

In the first feature of the present embodiment, the foregoing priority may be notified of through broadcast information transmitted by each radio base station eNB.

According to this feature, it is possible to notify the mobile station UE of the foregoing priorities by effectively using radio resources.

In the first feature of the present embodiment, the priority management unit 13 may be configured to give a higher priority to a radio base station set as a default radio base station than the priority of another radio base station, if the priorities are not notified of through the aforementioned broadcast information.

According to this feature, the mobile station UE can process RRC messages appropriately even when the priorities are not notified of through the aforementioned broadcast information.

In the first feature of the present embodiment, the foregoing priority may be notified of via dedicated signaling from each radio base station eNB.

According to this feather, the setting of the foregoing priority can be changed for each mobile station UE.

In the first feature of the present embodiment, the foregoing priority may be notified of through "Scell addition message (secondary cell addition message)" which is transmitted in setting the carrier aggregation.

According to this feather, the priority of Scell can be set by using the existing message during configuring of the CA.

In the first feature of the present embodiment, the foregoing priority may be notified of by each RRC message.

According to this feather, the setting of the foregoing priority can be changed for each RRC message.

It should be noted that the foregoing operations of the mobile station UE and the radio base station eNB#1/eNB#2 may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base station eNB#1/eNB#2. Otherwise, the storage medium and the processor may be provided as discrete components inside the mobile station UE and the radio base station eNB#1/eNB#2. Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2013-132781 (filed on Jun. 25, 2013) is incorporated by reference in the present specification.

INDUSTRIAL APPLICABILITY

As has been described above, the present invention makes it possible to provide a mobile station capable of avoiding a situation where important configuration setting is delayed during execution of "Inter-eNB CA".

EXPLANATION OF THE REFERENCE NUMERALS eNB#1/eNB#2 radio base station
UE mobile station
11 receiving unit
12 RRC message processing unit
13 priority management unit

The invention claimed is:

1. A mobile station configured to perform carrier aggregation by using a cell under a first radio base station and a cell under a second radio base station, the mobile station comprising:
   a priority management unit configured to manage a priority of each radio base station; and
   a processing unit configured to, when Radio Resource Control (RRC) messages are received simultaneously from the first radio base station and the second radio base station, process the RRC messages based on the priorities.

2. The mobile station according to claim 1, wherein the priority management unit is configured to give a higher priority to a radio base station, to which the mobile station is first connected after transitioning from an idle state to a connected state, than the priority of another radio base station.

3. The mobile station according to claim 1, wherein the priority management unit is configured to give a higher priority to an anchor radio base station than the priority of another radio base station.

4. The mobile station according to claim 3, wherein the anchor radio base station is a radio base station which establishes a connection for control signal with a mobility management node.

5. The mobile station according to claim 3, wherein the anchor radio base station is a radio base station under which a primary cell for the mobile station is established.

6. The mobile station according to claim 1, wherein the priority is notified of through broadcast information transmitted by each radio base station.

7. The mobile station according to claim 6, wherein if the priority is not notified of through the broadcast information, the priority management unit gives a higher priority to a radio base station set as a default radio base station than the priority of another radio base station.

8. The mobile station according to claim 1, wherein the priority is notified of through dedicated signaling from each radio base station.

9. The mobile station according to claim 8, wherein the priority is notified of through a secondary cell addition message which is transmitted during configuring of the carrier aggregation.

10. The mobile station according to claim 8, wherein the priority is notified of via each RRC message.

* * * * *